United States Patent
Shacham et al.

(10) Patent No.: US 9,442,793 B2
(45) Date of Patent: Sep. 13, 2016

(54) ROBUST HARDWARE/SOFTWARE ERROR RECOVERY SYSTEM

(71) Applicant: QUALCOMM Incorporated, San Diego, CA (US)

(72) Inventors: Assaf Shacham, Zichron Yaakov (IL); Itai Lanel, London (GB); Maya Haim, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/338,279

(22) Filed: Jul. 22, 2014

(65) Prior Publication Data

US 2015/0033071 A1  Jan. 29, 2015

Related U.S. Application Data

(60) Provisional application No. 61/857,571, filed on Jul. 23, 2013.

(51) Int. Cl.
*G06F 11/07* (2006.01)
*G06F 11/30* (2006.01)
*G06F 11/34* (2006.01)
*G06F 13/00* (2006.01)

(52) U.S. Cl.
CPC ....... *G06F 11/0793* (2013.01); *G06F 11/0721* (2013.01); *G06F 11/0745* (2013.01); *G06F 11/0772* (2013.01); *G06F 11/3024* (2013.01); *G06F 11/3409* (2013.01); *G06F 13/00* (2013.01); *G06F 2201/86* (2013.01)

(58) Field of Classification Search
CPC ........... G06F 11/0793; G06F 11/0721; G06F 11/3024; G06F 11/0772; G06F 11/0745; G06F 11/3409; G06F 2201/86; G06F 11/0724; G06F 11/0757
See application file for complete search history.

(56) References Cited

U.S. PATENT DOCUMENTS

| | | | |
|---|---|---|---|
| 5,513,346 A * | 4/1996 | Satagopan | G06F 11/0724 714/48 |
| 6,546,482 B1 | 4/2003 | Magro et al. | |
| 6,594,785 B1 | 7/2003 | Gilbertson et al. | |
| 6,615,374 B1 * | 9/2003 | Moran | G06F 11/0724 714/48 |
| 6,802,039 B1 * | 10/2004 | Quach | G06F 11/073 711/E12.017 |
| 6,966,042 B2 * | 11/2005 | Carr | G01R 31/31704 714/E11.025 |
| 2004/0230877 A1 | 11/2004 | Clark et al. | |

(Continued)

FOREIGN PATENT DOCUMENTS

EP    0955585 A2    11/1999

OTHER PUBLICATIONS

International Search Report and Written Opinion—PCT/US2014/047908—ISA/EPO—Nov. 17, 2014.

*Primary Examiner* — Nadeem Iqbal
(74) *Attorney, Agent, or Firm* — Loza & Loza, LLP

(57) ABSTRACT

A method for error detection and recovery is provided in which a host controller and host software collaborate together. The host controller may: detect an error condition, set an error interrupt or register, and/or halt task execution or processing at the host controller. The host software may: detect an error condition as a result of the host controller having set the error interrupt or register; performs error handling, and clears the error condition. The host controller then resumes execution or processing of tasks upon detecting that error condition has been cleared by the host software.

26 Claims, 8 Drawing Sheets

(56) References Cited

U.S. PATENT DOCUMENTS

2012/0311380 A1 12/2012 Moyer

2015/0033071 A1\* 1/2015 Shacham ............ G06F 11/0793
714/10

\* cited by examiner

*Halt and Discard Task Sequence Method*

*Host Controller & Software - Error Detection and Recovery Method*

*Host Controller -Error Detection and Recovery Method*

*Host Software -Error Detection and Recovery Method*

ROBUST HARDWARE/SOFTWARE ERROR RECOVERY SYSTEM

CLAIM OF PRIORITY UNDER 35 U.S.C. §119

The present utility patent application claims priority to U.S. Provisional Patent Application No. 61/857,571 entitled "Robust Hardware/Software Error Recovery System", filed Jul. 23, 2013, which is assigned to the assignee hereof and hereby expressly incorporated by reference herein.

FIELD

Various aspects relate generally to error recovery of hardware/software systems, and more particularly to a system, method, and/or device in which error recovery is synchronized across hardware and software.

BACKGROUND

A host system may comprise an I/O host controller (hardware), an input/output (I/O) host software (e.g., a driver), and a target I/O device. The host controller may communicate with the target I/O device to send/receive tasks (e.g., data, commands, etc.) The host software may provide the tasks to the host controller.

Hardware operating errors sometimes occur, for instance, in a controller. Because hardware works faster than software, it is difficult for software to intervene, for example, to recover from or correct such errors. In many cases, the event which required intervention has already passed, and the state of the host system has changed by the time it takes for software to respond. Moreover, the hardware (e.g., controller) may still be performing operations when the software is trying to investigate its state (e.g., state of the host controller and the host system).

Consequently, there is a need to provide a mechanism to allow software to efficiently intervene in the operation of hardware to recover from errors.

SUMMARY

A host controller is provided comprising an interface to access one or more registers and a processing circuit coupled to the interface. The processing circuit may be adapted to: (a) process one or more tasks from a task queue; (b) monitor for error conditions while processing the tasks; (c) set an error register upon detection of an error condition in the processing of tasks; (d) halt task execution or processing of tasks; (e) poll the error register to ascertain whether the error condition has been cleared; and/or (f) resume execution or processing of tasks upon detection that the error condition has been cleared. The host controller may halts execution or processing tasks upon finishing one of a current task, a current command, and a current instruction. The error register may be located in a shared register space accessible to error handling software external to the host controller. In one example, error condition may be cleared by an external error handling software. In some implementations, the tasks may include at least one of read or write operation with an external storage device.

A method operational at a host controller is also provided. The host controller may process one or more tasks from a task queue while monitoring for error conditions. An error register may be set by the host controller upon detection of an error condition in the processing of tasks. Additionally, task execution or processing of tasks may be halted by the host controller. The host controller may halt execution or processing tasks upon finishing one of a current task, a current command, and a current instruction. The host controller may then poll the error register (or some other flag, register, and/or indicator) to ascertain whether the error condition has been cleared. The error register may be located in a shared register space accessible to error handling software external to the host controller. Upon detection that the error condition has been cleared, the host controller may resume execution or processing of tasks. The host controller may further instruct an external target device with which the host controller communicates to clear some or all task in the external target device.

A non-transitory processor-readable storage medium having one or more instructions is also provided which, when executed by at least one processing circuit, cause the at least one processing circuit to: (a) process one or more tasks from a task queue; (b) monitor for error conditions while processing the tasks; (c) set an error register upon detection of an error condition in the processing of tasks; (d) halt task execution or processing of tasks; (e) poll the error register to ascertain whether the error condition has been cleared; and/or (f) resume execution or processing of tasks upon detection that the error condition has been cleared.

A host device is also provided comprising: one or more registers, a host controller, and a processing circuit coupled to the host controller and the one or more registers. The processing circuit execute a host software, wherein the host software may be adapted to perform error handling on the host controller by: (a) polling an error register to ascertain whether an error has been set by the host controller; (b) performing error handling upon detection that the error register has been set; and/or (c) clearing the error register upon completion of error handling. The processing circuit and host controller may be integrated into a single semiconductor device. In one example, at least one of the host software and host controller may further perform at least one of: (a) clearing all task pending on a task queue of the host device; (b) clearing specific tasks pending on the task queue of the host device; and/or (c) instructing an external target device with which the host controller communicates to clear some or all task in the target device.

A method is also provided performed by software on a host device. An error register may be polled by the host software to ascertain whether an error has been set by a host controller. Error handling may be performed upon detection that the error register has been set. The error register may be cleared upon completion of error handling. In one example, the method may further comprise: (a) clearing all task pending on a task queue of the host device; (b) clearing specific tasks pending on the task queue of the host device; and/or (c) instructing an external target device with which the host controller communicates to clear some or all task in the target device.

Additionally, a host device is provided, comprising: a processing circuit executing a host software, and a host controller coupled to the processing circuit. The host controller and host software are adapted to: (a) detecting an error condition at the host controller; (b) setting an error interrupt or register by the host controller; (c) halting task execution or processing by the host controller; (d) detecting an error condition at the host software as a result of the host controller having set the error interrupt or register; (e) performing error handling by at least one of the host software and host controller; (f) clearing the error condition by the host software; and/or (g) resuming execution or processing of tasks at the host controller upon detecting that error condition has been cleared by the host software. The host controller and host software may have access to a shared register space including the error interrupt or register. The host software may check registers to ascertain details of the error condition.

A method operational on a host device is provided, comprising: (a) detecting an error condition at a host controller; (b) setting an error interrupt or register by the host controller; (c) halting task execution or processing by the host controller; (d) detecting an error condition at a host software as a result of the host controller having set the error interrupt or register; (e) performing error handling by at least one of the host software and host controller; (f) clearing the error condition by the host software; and/or (g) resuming execution or processing of tasks at the host controller upon detecting that error condition has been cleared by the host software. At least one of the host software and host controller may further perform at least one of: (a) clearing all task pending on a task queue of the host device; (b) clearing specific tasks pending on the task queue of the host device; and/or (c) instructing a target device with which the host controller communicates to clear some or all task in the target device.

DRAWINGS

DETAILED DESCRIPTION

Figure 1:
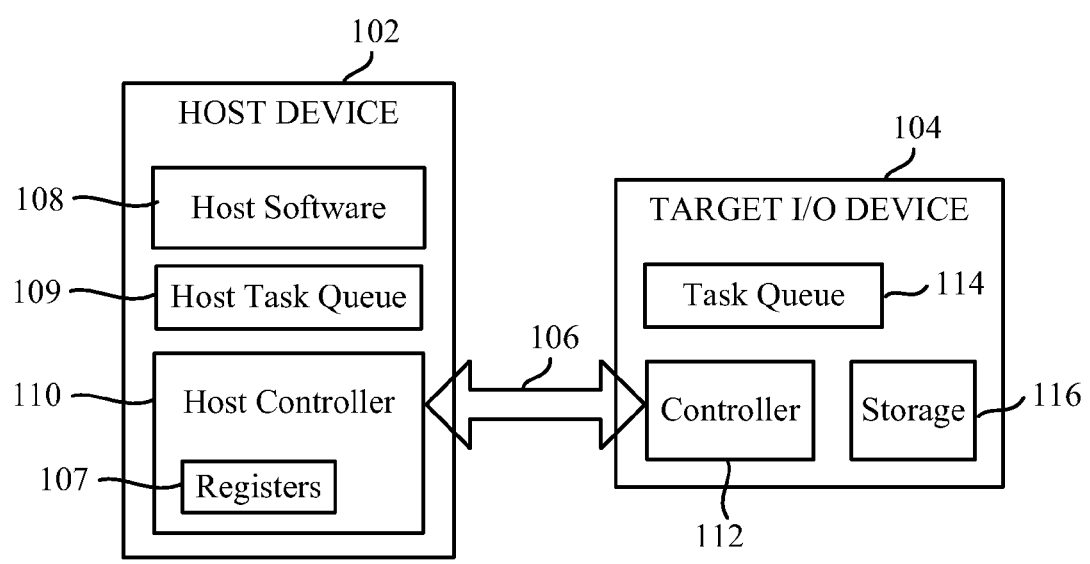
FIG. 1 is a block diagram of a system comprising a host device coupled to an external target I/O device via a bus, where the host device is adapted to halting operations upon the occurrence of an error to allow software to the recover or correct the error.

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, electronic devices, mobile devices, computing devices, and/or communication standards.

Overview

Various features and aspects of the present disclosure pertain to a freezing, halting, or suspending operation of hardware upon the occurrence of an error to allow software to handle the error (e.g., perform recovery or correct the error). For instance, a host device may include a host controller and software, where the host controller is adapted or designed to stop hardware operations in known locations (e.g., at a particular point of a queue) and/or state upon the occurrence of an error. The host controller freezes, halts, or suspends all activity such that software can investigate or handle the error(s) while the host controller and any external target device(s) are in a frozen or suspended state. When the host controller encounters an error and triggers a software interrupt, it halts all hardware activity until instructed to resume activity by software. Similarly, when software decides to intervene, for whatever reason, in hardware activity, the software orders the host controller to halt or pause operations. The host controller may complete a current command and halts/suspends its operation in a known location (e.g., within a particular point of a queue) or state. An external target device may wait for the host controller to initiate activity, so the target device is also halted or suspended when the host controller halts or suspends its own activity. The host controller may indicate to the software (e.g., running on the host device) that it is now in a frozen or paused state. The software can step in, investigate the current state in the host controller and the target device, run an error handling procedure (e.g., error recovery procedure, error correction procedure, or any other procedure), while there are no parallel processes running (i.e., the hardware is halted or suspended). When the procedure is completed by the software, it may direct the host controller to resume its operations. The elimination of a hardware/software race conditions and uncertainties simplifies the error recovery and other hardware/software procedures.

Exemplary Operating Environment

FIG. 1 is a block diagram of a system comprising a host device 102 coupled to an external target I/O device 104 via a bus 106, where the host device is adapted to halting operations upon the occurrence of an error to allow software to the recover or correct the error. The host device 102 may include host software 108, a task queue 109, one or more registers 107, and/or a host controller 110. The target I/O device 104 may include a controller 112, a task queue 114, and a storage device 116. The host task queue 109 may hold the tasks (e.g., operations or commands) being sent to the target I/O device 104. For instance, such host task queue 109 may be used by the host software 108 to provide tasks to the host controller 110 and may be used to hold the tasks until they are sent to the target I/O device 104. The registers 107 (e.g., within the host controller or elsewhere within the host device 102) may serve to transfer status information between the software 108 and/or the host controller 110. For example, the registers 107 may contain information about which tasks in the host task queue 109 have been sent to the target I/O device 104 and which have not.

In one implementation, the target I/O device 104 may be separate or external from the host device 102 or may be integrated as part of a single semiconductor chip along with the host device 102. In one example, the target I/O device 104 may be a flash storage device that is compliant with the Embedded Multi-Media Controller (eMMC) standard by the Joint Electron Device Engineering Council (JEDEC). In such example, the host device 102 may read and/or write data (e.g., identified in the host task queue 109) from/to the target I/O device 104.

Figure 2:
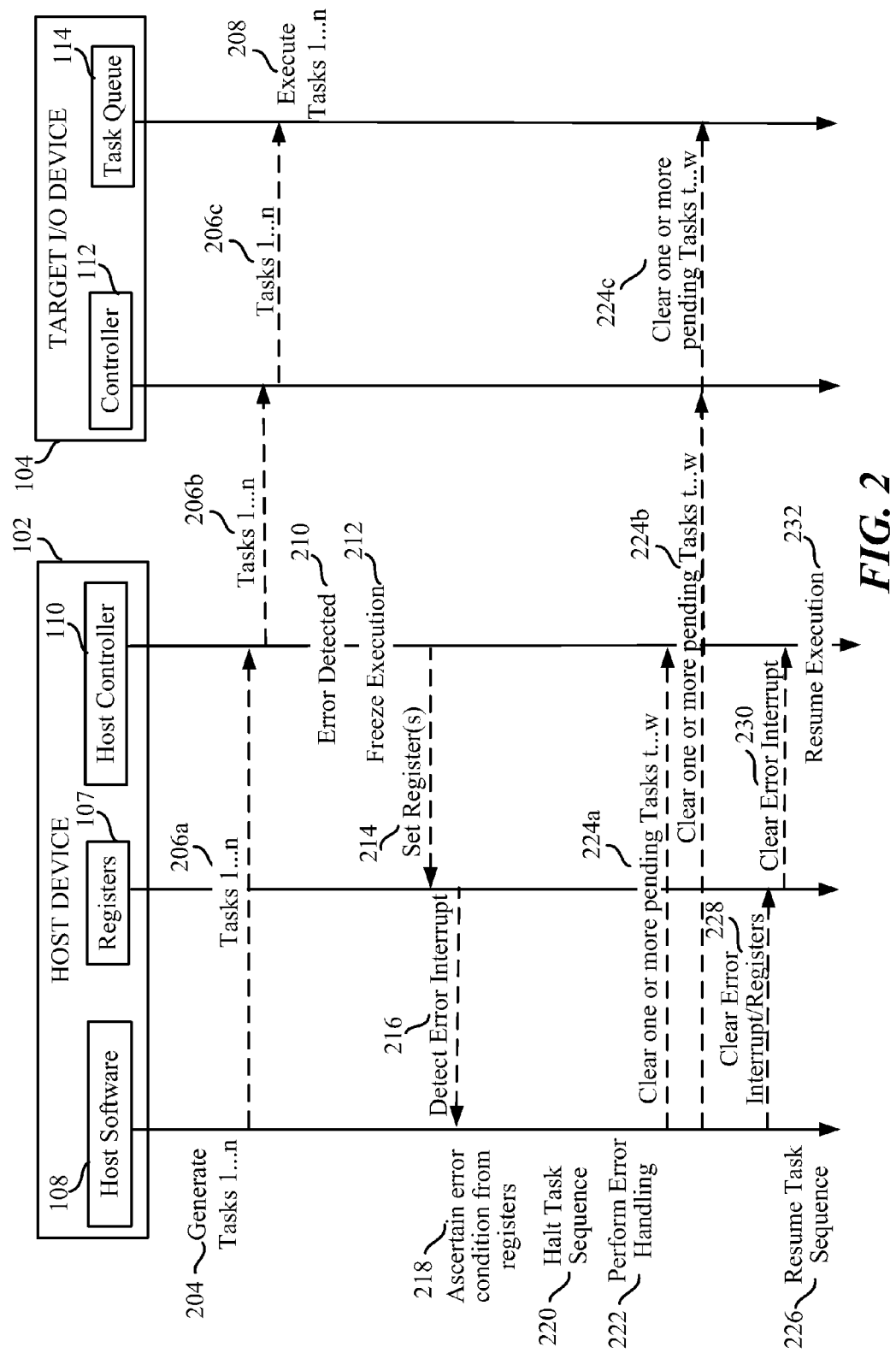
FIG. 2 illustrates an exemplary approach to error detection in a hardware/software system.

FIG. 2 illustrates an exemplary approach to error detection in a hardware/software system. The host software 108 may generate tasks 1 . . . n 204 and provide them 206a to the host controller 110. The host controller 110 then sends the tasks 1 . . . n 206b to the target controller 112 which provides them 206c to the task queue 114 from where they can be executed or processed 208 by the target I/O device 104. The "task" disclosed herein may be data and/or non-data tasks. The target I/O device 104 may send acknowledgments or indicators back to the host device 102 upon execution or processing of each task.

According to one feature, upon detection of an error 210 the host controller 110 may be adapted to freeze/halt its execution or processing 212. Such freeze/halt point may be, for example, upon finishing processing of a current task (e.g., a specific combination/plurality of commands), a command (e.g., a specific combination/plurality of basic instructions), an instruction (e.g., a current instruction). The host controller 110 then sets one or more error registers 214 which cause an error interrupt to be triggered/detected 216 by the host software 108. Upon detection of such error interrupt 216 by the host software 108, the host software 108 may ascertain the error condition from the registers 218 (e.g., determine the type of error, etc.), halts the task sequence 220 (e.g., halt task generation and/or processing), and perform error handling 222. In one example, such error handling may include clearing/removing one or more pending tasks t . . . w 224a. For instance, this may involve removing the specific tasks t . . . w from the host task queue 109 and/or instructing the host controller 110 to remove them or not execute those specific tasks. Additionally, where the tasks t . . . w have already been sent to the target I/O device 104, the host software 108 may send additional messages 224b to the target device controller 112 to clear the one or more tasks t . . . w and/or remove them from the target device task queue 114.

Upon completing its error handling operations 222, the host software 108 may then clear the error interrupt and/or error registers 228 and/or instruct the host controller 110 to do so 230. Upon receiving such indication that the error handling has been completed, the host controller may resume execution 232 of tasks remaining the host task queue 109. In this manner, the host controller 110 collaborates with the host software 108 to handle error recovery while avoiding race conditions between them.

Figure 3:
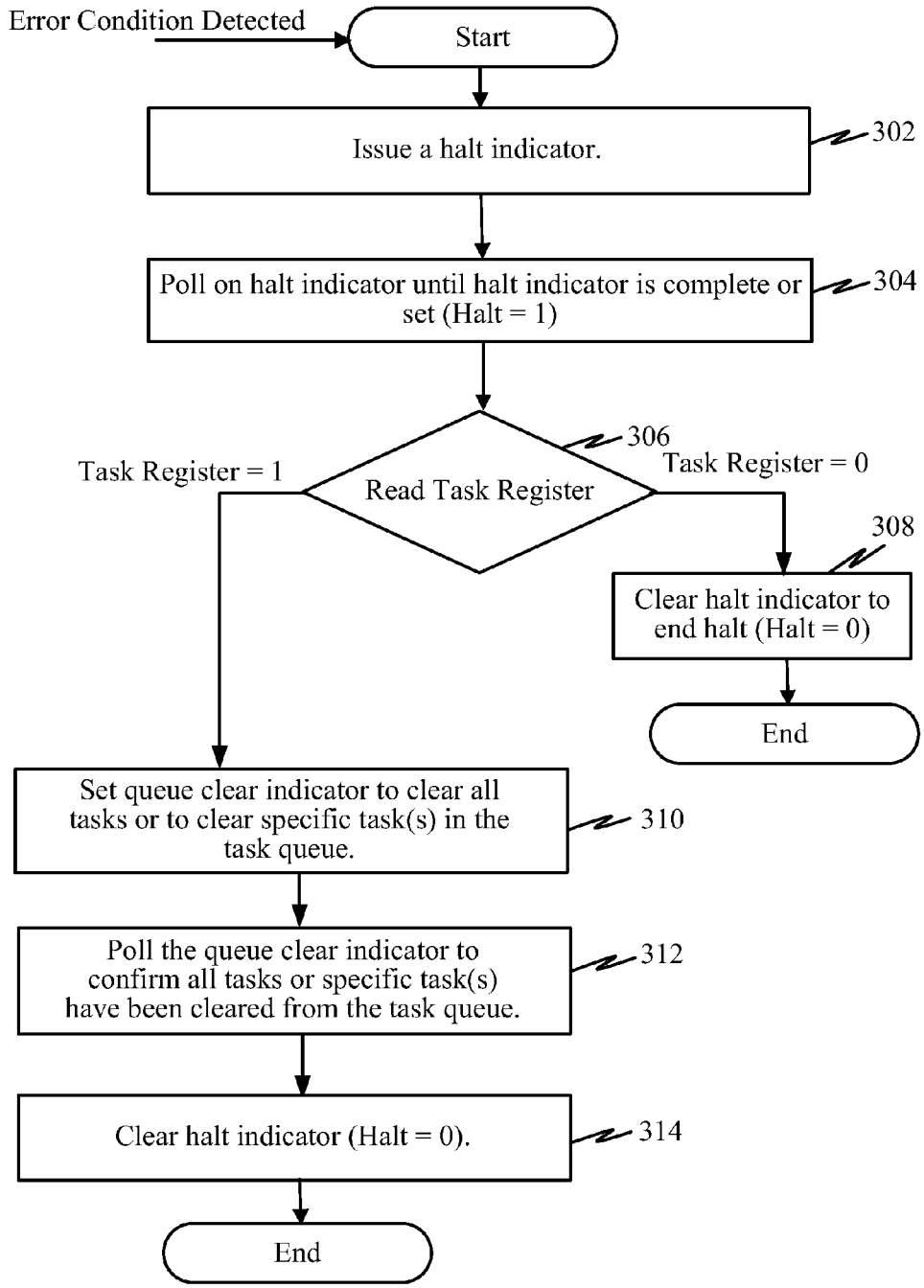
FIG. 3 illustrates an exemplary method operational on a host controller for halting and discarding a task sequence.

FIG. 3 illustrates an exemplary method operational on a host controller for halting and discarding a task sequence. Upon detection of an error condition, the host software may issue a halt indicator 302 (e.g., write "1" to a halt bit in a first configurable register) or use other method for issuing a "halt" instruction, indicator, flag, or interrupt to the host controller. The host software may then poll the halt indicator (e.g., a halt bit in the first configurable register) until the halt indicator is complete or set 304 (e.g., set to "1" or High). That is, even though the host software has previously set the halt indicator, it may have to check to make sure all other processes have stopped to confirm that the halt indicator is actually set. Note that, instead of polling on the halt indicator, an interrupt, or other notification method, may be used to notify the host software when the halt indicator is completely set.

The host controller may then ascertain whether there are additional tasks in its task queue. For instance, the host controller may read a task register 306 to ascertain whether there are any tasks to be executed or pending. If the task register is clear (task_register=0) this means all tasks have been executed (i.e., not tasks pending in the task queue) then the host controller may clear the halt indicator (e.g., halt bit in the first configurable register is set to "0" or Low) 308 and resumes operations.

Otherwise, if the task register is set (e.g., task_register="1" or High), the host controller may set a queue clear indicator to clear all tasks or to clear specific tasks in the task queue 310. The host controller may then poll queue clear indicator (or a corresponding register) to verify that the tasks have been cleared from the task queue 312. Once such error recovery/correction steps have been completed, the host controller may reset the halt indicator (halt bit=0 or Low) 314 and resumes execution or processing of tasks.

Exemplary Host Device

Figure 4:
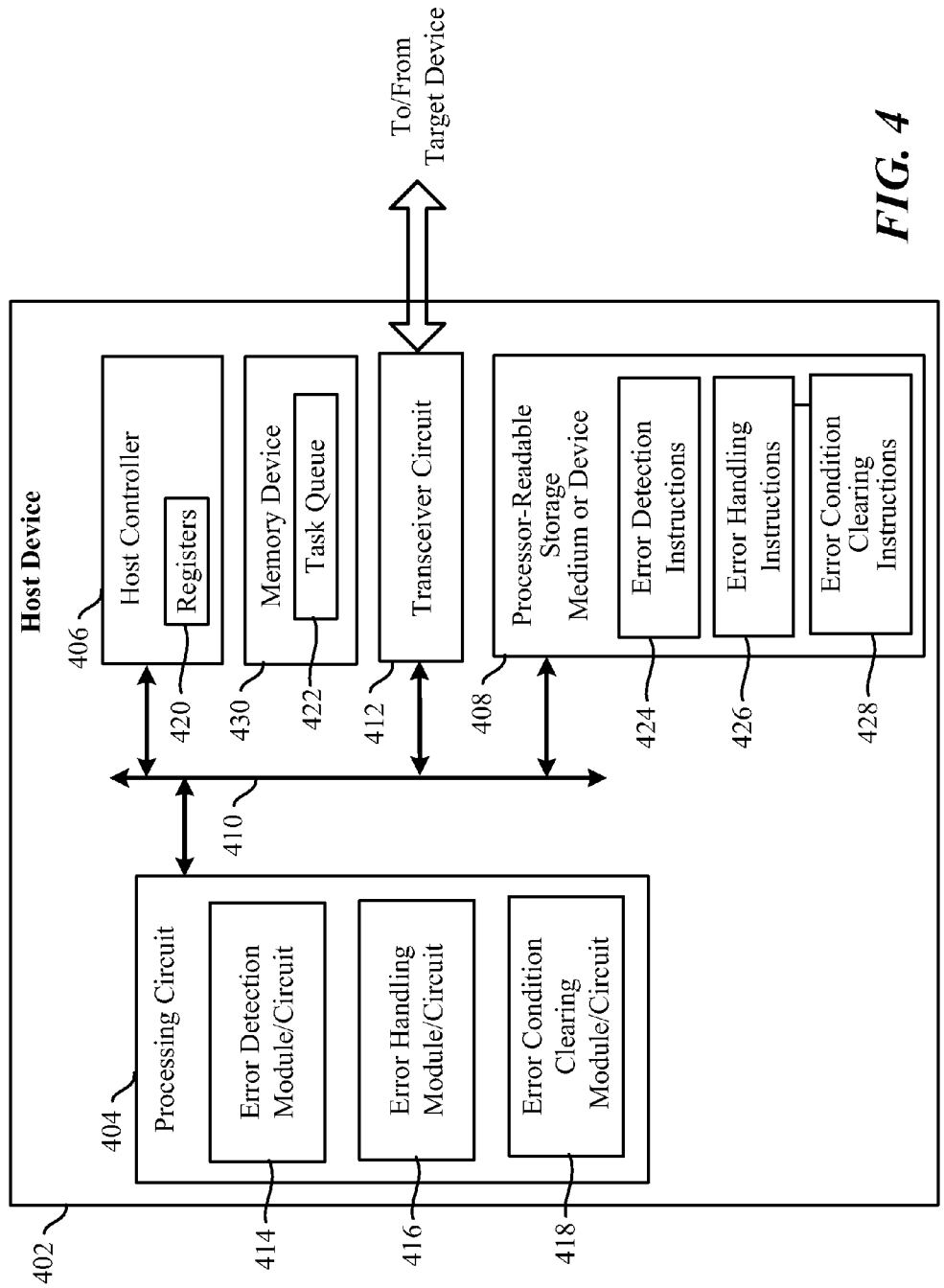
FIG. 4 is a block diagram illustrating a host device adapted to facilitate error correction and recovery between hardware and software.

FIG. 4 is a block diagram illustrating a host device adapted to facilitate error correction and recovery between hardware and software. The host device 402 may include a processing circuit 404, a host controller 406, a processor-readable storage medium/device 408, a memory device 430, a transceiver circuit 412, and a bus 410. The host controller 406 may obtain tasks from a task queue 422 within a memory device 430 and execute the tasks and/or send the tasks (e.g., including data and commands) to a target device via the transceiver circuit. For example, the host controller 406 may perform read and/or write operations on the target device (e.g., external storage device). The host controller 406 may maintain status information for the tasks being processed in one or more registers 420 which may be within the host controller 406, the memory device 430, or elsewhere. The host controller 406 may be adapted to halt its processing of the tasks in the task queue 422 upon detection of an error and either triggers a software interrupt or sets a flag (e.g., within a register) to inform host software of the occurrence of an error condition.

The processing circuit may be adapted to execute host software and/or functional circuits. For example, an error detection module/circuit 414 may be adapted to detect or monitor when the host controller 406 has set an error flag or triggered and error interrupt. An error handling module/circuit 416 may be adapted to perform error recovery or correction on the host controller 406. For example, such error handling module/circuit 416 may clear one or more tasks in the task queue 422 and/or reset one or more of the registers 420. An error condition clearing module/circuit 418 may clear the software interrupt, clear one or more flags set by the host controller 406, and/or otherwise informs the host controller 406 that the error has been handled and that the host controller 406 may resume processing. Upon being notified that the error handling has been cleared, the host controller 406 may resume processing of tasks in the task queue. The processor-readable storage medium/device 408 may include error detection instructions, error handling instructions 426, and/or error condition clearing instructions 428 which may be executed by the processing circuit 404 to execute its functions.

Figure 5:
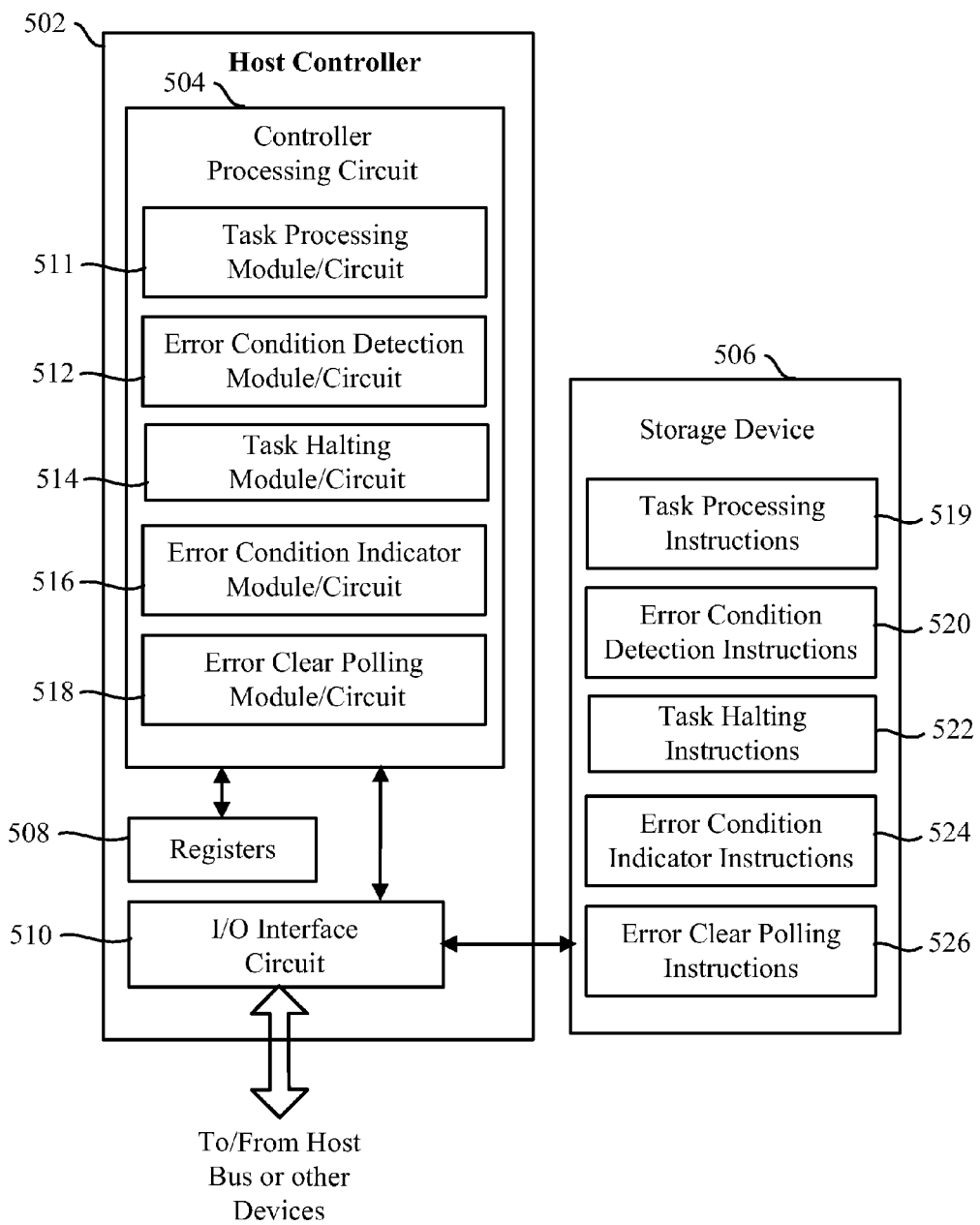
FIG. 5 is a block diagram of an exemplary host controller that may be adapted to facilitate error handling.

FIG. 5 is a block diagram of an exemplary host controller 502 that may be adapted to facilitate error handling. In this example, the host controller 502 may include a controller processing circuit 504 coupled to one or more registers 508, and/or an input/output interface circuit 510. The controller processing circuit 504 may include a task processing module/circuit, an error condition detection module/circuit 512, a task halting module/circuit 514, an error condition indicator module/circuit 516, and/or an error clearing polling module/circuit 518.

The task processing module/circuit may retrieve a task from a task queue, process the retrieved task, and then process the next task in the task queue. Such tasks may include, for example, performing read or write operations from/to an external target device. The error condition detection module/circuit 512 may ascertain if an error has occurred in processing the tasks. In response to detecting an error condition, the task halting module/circuit 514 may halt, suspend, and/or freeze further processing by the host controller 502 (e.g., halt processing of any further tasks). The controller processing circuit may finish or terminate a current task, and then halt any further processing. The error condition indicator module/circuit 516 may set a flag, register, and/or a hardware/software interrupt to indicate that an error condition has been detected by the host controller 502. This may allow external or internal software to perform error handling to address the error condition. The error clearing polling module/circuit 518 may ascertain if and/or when the error condition has been handled so that the task processing module/circuit can resume operation.

In one example, the host controller 502 may be coupled to a storage device 506 (e.g., via the I/O interface circuit 510 in order to obtain one or more operating instructions. For example, the storage device 506 may include task processing instructions 519 to process tasks from a task queue, error condition detection instructions 520 to detect errors during task processing, task halting instructions 522 to halt task processing when an error is detected, error condition indicator instructions 524 to set a flag, register, or other indicator that allows software to intervene for purposes of error recovery, and/or error clear polling instructions 526 that allows the host controller to monitor, detect, and/or poll for a clearing of the previously set flag, register, or indicator (i.e., for an indication that the error condition has been addressed).

Figure 6:
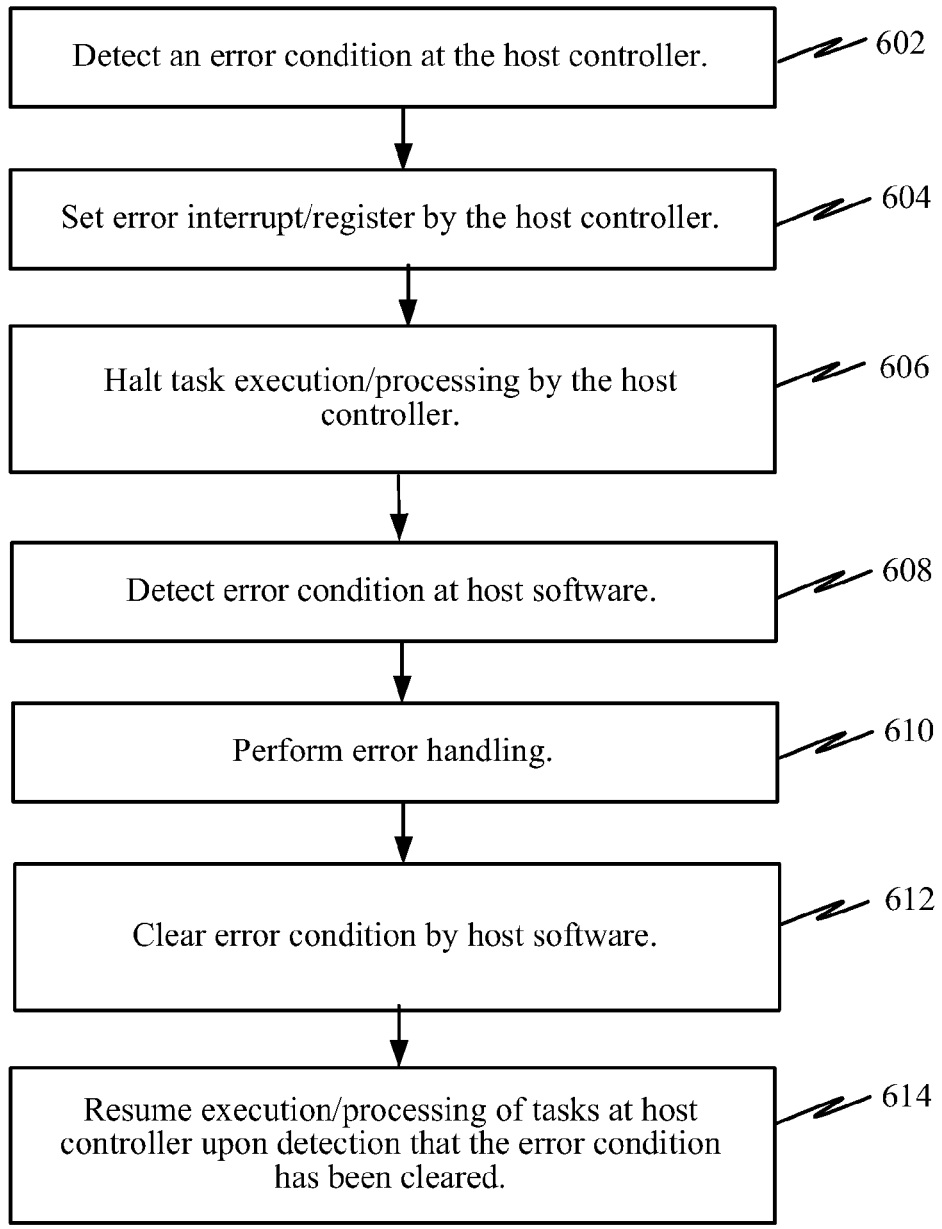
FIG. 6 illustrates an exemplary method operational between a host controller and host software to perform error detection and recovery.

FIG. 6 illustrates an exemplary method operational between a host controller and host software to perform error detection and recovery. The host controller may: (a) detect an error condition 602 (e.g., based on a notification from the host software), (b) set an error interrupt or register 604, and/or (c) halt task execution or processing 606. The host software may: (d) detect an error condition as a result of the host controller having set the error interrupt or register 608, (e) perform error handling 610, and/or clear the error condition 612 (upon finishing error handling). The host controller may then resume execution or processing of tasks upon detection that error condition has been cleared by the host software 614. Note that host software may be executed by a processing circuit coupled to the host controller. The processing circuit and host controller may be integrated into a single semiconductor device. The host controller and host software may have access to a shared register space including the error interrupt or register.

In one example, performing error handling by at least one of the host software and host controller includes at least one of: (i) clearing all task pending on a task queue of the host device; (ii) clearing specific tasks pending on the task queue of the host device; and/or (iii) instructing a target device with which the host controller communicates to clear some or all task in the target device.

In other examples of performing error handling by at least one of the host software and host controller, pending tasks may not or need not be cleared from the task queue of the host device and/or the task queue in the target device.

Note that the host controller may halt task execution or processing upon finishing one of a current task, a current command, and a current instruction.

Figure 7:
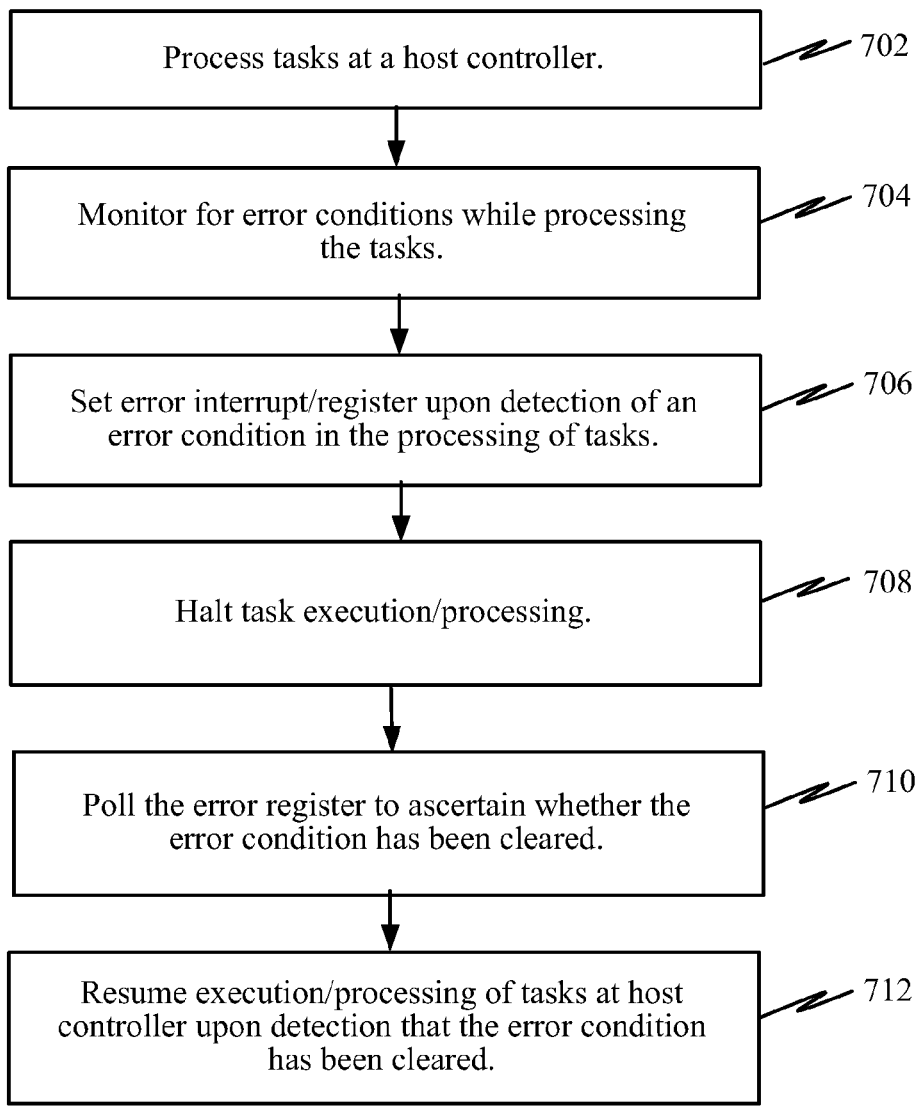
FIG. 7 illustrates an exemplary method operational by host controller for error detection and recovery.

FIG. 7 illustrates an exemplary method operational by host controller for error detection and recovery. The host controller may process tasks 702 (e.g., from a task queue). For example, a task may be a read and/or a write operation from/to an external target device. The host controller may monitor for error conditions while processing the tasks 704. The host controller may set an error register upon detection of an error condition in the processing of tasks 706. Additionally, the host controller halts task execution/processing 708. Halting processing by the host controller also freezes the state of registers, so that error handling can be performed by the host software. While halted, the host controller may poll the error register to ascertain whether the error condition has been cleared 710. Note that, in other examples, a different register, indicator, flag or mechanism may be used to indicate to the host controller that the error condition has been addressed or cleared. Upon detecting that the error condition has been cleared the host controller may resume execution/processing 712.

Figure 8:
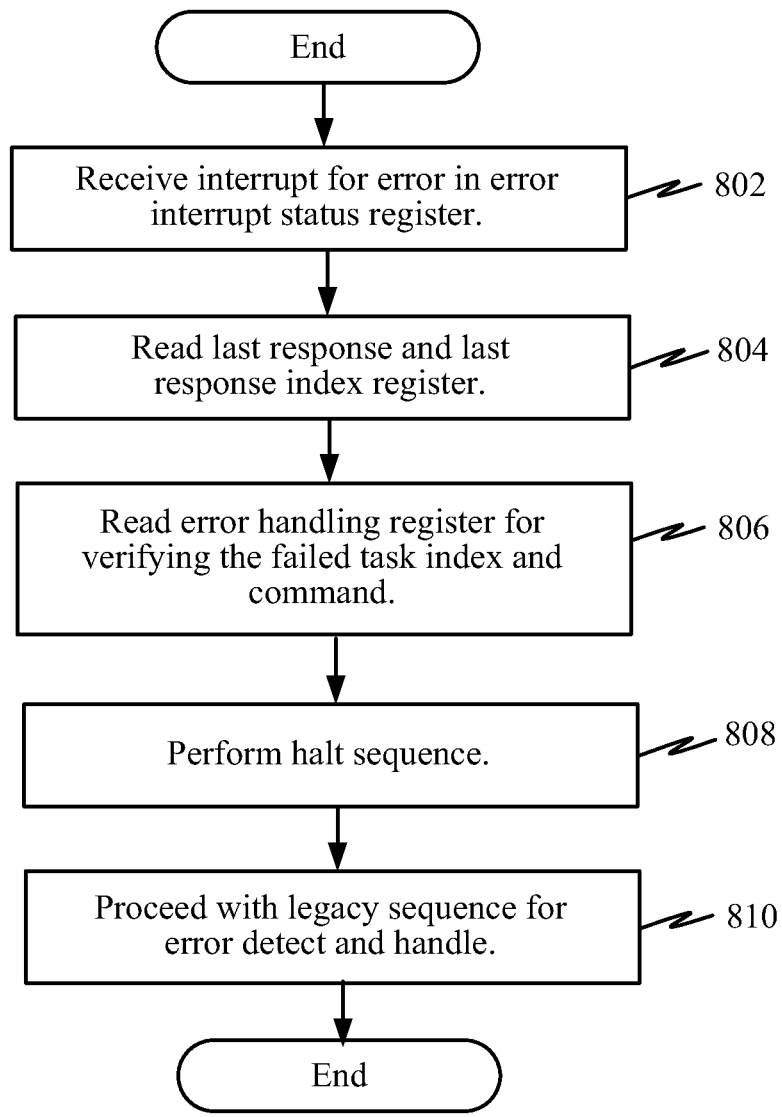
FIG. 8 illustrates an exemplary method operational by host software for error detection and recovery.

FIG. 8 illustrates an exemplary method operational by host software for error detection and recovery. Upon receiving/detecting an error interrupt from an error interrupt register 802, the host software may read the last response and/or last response index register 804. The host software may also read an error handling register to verify the failed task index and command 806. The host software may then perform a task halt sequence or operations 808 and proceeds with a sequence of error detection and handling 810.

While the above discussed aspects, arrangements, and embodiments are discussed with specific details and particularity, one or more of the components, steps, features and/or functions illustrated in FIGS. 1, 2, 3, 4, 5, 6, 7 and/or 8 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 4, and/or 5 may be configured to perform or employ one or more of the methods, features, parameters, and/or steps described in FIGS. 2, 3, 6, 7 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a non-transitory machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A host controller, comprising:
   an interface to access one or more registers;
   a processing circuit coupled to the interface and adapted to
   set an error register upon detection, by host controller hardware, of an error condition in the processing of tasks;
   halt task execution or processing of tasks by host controller hardware;
   resume execution or processing of tasks, by host controller hardware, upon detection that the error condition has been cleared by a host software operating at the processing circuit.

2. The host controller of claim 1, wherein the processing circuit is further adapted to
   process one or more tasks from a task queue; and
   monitor for error conditions while processing the tasks.

3. The host controller of claim 1, wherein the processing circuit is further adapted to
   poll the error register to ascertain whether the error condition has been cleared by the host controller software.

4. The host controller of claim 1, wherein the host controller halts execution or processing tasks upon finishing one of a current task, a current command, and a current instruction.

5. The host controller of claim 1, wherein the error register is located in a shared register space accessible to error handling software external to the host controller.

6. The host controller of claim 1, wherein the error condition is cleared by an external error handling software.

7. The host controller of claim 1, wherein halting task execution or processing of tasks includes stopping hardware operations in known location or state upon finishing one of a current task, a current command, and a current instruction.

8. A method operational at a host controller, comprising:
   setting an error register upon detection, by host controller hardware, of an error condition in the processing of tasks by a processing circuit;
   halting, by the host controller hardware, task execution or processing of tasks by the processing circuit; and
   resuming execution or processing of tasks, by the host controller hardware, upon detection that the error condition has been cleared by a host software operating at the processing circuit.

9. The method of claim 8, further comprising:
   processing one or more tasks from a task queue; and
   monitoring for error conditions while processing the tasks.

10. The method of claim 8, further comprising:
    polling the error register to ascertain whether the error condition has been cleared by the host controller software.

11. The method of claim 8, wherein the host controller halts execution or processing tasks upon finishing one of a current task, a current command, and a current instruction.

12. The method of claim 8, wherein the error register is located in a shared register space accessible to error handling software external to the host controller.

13. The method of claim 8, further comprising:
    instructing an external target device with which the host controller communicates to clear some or all task in the external target device.

14. A non-transitory processor-readable storage medium having one or more instructions which, when executed by at least one processing circuit, cause the at least one processing circuit to:
    set an error register upon detection, by host controller hardware, of an error condition in the processing of tasks by a processing circuit;
    halt, by the host controller hardware, task execution or processing of tasks by the processing circuit; and
    resume execution or processing of tasks, by the host controller hardware, upon detection that the error condition has been cleared by a host software operating at the processing circuit.

15. The storage medium of claim 14, wherein the one or more instructions further cause the at least one processing circuit to:
    process one or more tasks from a task queue; and
    monitor for error conditions while processing the tasks.

16. The storage medium of claim 14, wherein the one or more instructions further cause the at least one processing circuit to:
    poll the error register to ascertain whether the error condition has been cleared.

17. A host device, comprising:
    one or more registers including an error register;
    a host controller including hardware configured to detect an error in task execution or processing of tasks and set the error register when such error is detected;
    a processing circuit coupled to the host controller and the one or more registers and executing a host software, wherein the host software is adapted to perform error handling on the host controller by
    polling, by the host software, the error register to ascertain whether an error has been set by the host controller;
    performing error handling, by the host software, upon detection that the error register has been set; and
    clearing, by a host software, the error register upon completion of error handling.

18. The host device of claim 17, wherein the processing circuit and host controller are integrated into a single semiconductor device.

19. The host device of claim 17, wherein at least one of the host software and host controller further performs at least one of:
    clearing all task pending on a task queue of the host device;
    clearing specific tasks pending on the task queue of the host device; and
    instructing an external target device with which the host controller communicates to clear some or all task in the target device.

20. A method performed by a host software on a host device, comprising:
- polling, by the host software, an error register to ascertain whether an error has been set, at a hardware level, by a processing circuit of a host controller;
- performing error handling, by the host software, upon detection that the error register has been set by the processing circuit; and
- clearing, by the host software, the error register upon completion of error handling by the processing circuit.

21. The method of claim 20, further comprising:
- clearing all task pending on a task queue of the host device;
- clearing specific tasks pending on the task queue of the host device; and
- instructing an external target device with which the host controller communicates to clear some or all task in the target device.

22. A host device, comprising:
- a processing circuit executing a host software;
- a host controller coupled to the processing circuit, wherein the host controller and host software are adapted to:
  - detect, at a hardware level, an error condition at the host controller;
  - set an error interrupt or register, at the hardware level, by the host controller;
  - halt task execution or processing by the host controller;
  - detect an error condition at the host software as a result of the host controller having set the error interrupt or register;
  - perform error handling by at least one of the host software and host controller;
  - clear the error condition by the host software; and
  - resume execution or processing of tasks at the host controller upon detecting that error condition has been cleared by the host software.

23. The host device of claim 22, wherein the host controller and host software have access to a shared register space including the error interrupt or register.

24. The host device of claim 22, further comprising:
- checking registers, by the host software, to ascertain details of the error condition.

25. A method operational on a host device, comprising:
- detecting, at a hardware level, an error condition at a host controller by a processing circuit;
- setting an error interrupt or register, at the hardware level, at the host controller by the processing circuit;
- halting task execution or processing at the host controller by the host controller;
- detecting an error condition at a host software as a result of the host controller having set the error interrupt or register;
- performing error handling by at least one of the host software and host controller;
- clearing the error condition by the host software; and
- resuming execution or processing of tasks at the host controller upon detecting that error condition has been cleared by the host software.

26. The method of claim 25, wherein at least one of the host software and host controller further performs at least one of:
- clearing all task pending on a task queue of the host device;
- clearing specific tasks pending on the task queue of the host device; and
- instructing a target device with which the host controller communicates to clear some or all task in the target device.

* * * * *